United States Patent
Shintaku et al.

(10) Patent No.: US 11,661,554 B2
(45) Date of Patent: May 30, 2023

(54) HYDROTREATING CATALYST FOR HEAVY HYDROCARBON OIL, METHOD FOR PRODUCING THE SAME, AND METHOD FOR HYDROTREATING HEAVY HYDROCARBON OIL

(71) Applicant: JGC Catalysts and Chemicals Ltd., Kawasaki (JP)

(72) Inventors: Hiroshi Shintaku, Kitakyushu (JP); Kenji Yamane, Kitakyushu (JP); Yusuke Matsumoto, Kitakyushu (JP)

(73) Assignee: JGC Catalysts and Chemicals Ltd., Kawasaki (JP)

( * ) Notice: Subject to any disclaimer, the term of this patent is extended or adjusted under 35 U.S.C. 154(b) by 0 days.

(21) Appl. No.: 17/518,860

(22) Filed: Nov. 4, 2021

(65) Prior Publication Data
US 2022/0135888 A1  May 5, 2022

(30) Foreign Application Priority Data
Nov. 5, 2020 (JP) .............................. JP2020-185379

(51) Int. Cl.
*C10G 45/04* (2006.01)
*B01J 23/883* (2006.01)
(Continued)

(52) U.S. Cl.
CPC .............. *C10G 45/08* (2013.01); *B01J 21/04* (2013.01); *B01J 23/883* (2013.01);
(Continued)

(58) Field of Classification Search
CPC ...... B01J 21/04; B01J 23/883; B01J 35/1019; B01J 35/1042; B01J 35/1047; B01J 35/1061; B01J 37/0201; B01J 37/088
See application file for complete search history.

(56) References Cited

U.S. PATENT DOCUMENTS 10,286,386 B2  5/2019  Yamane et al.
2005/0113250 A1*  5/2005  Schleicher ............... B01J 35/10
502/305
(Continued)

FOREIGN PATENT DOCUMENTS

JP  2002210362 A  7/2002
JP  2004073912 A  3/2004
(Continued)

OTHER PUBLICATIONS

Al-Dalama, et al., "Temperature programmed reduction of SiO2—Al2O3 supported Ni, Mo and NiMo catalysts prepared with EDTA", Thermochimica Acta, 2011, pp. 67-74, vol. 520.

Zhaobin, et al., "Titania-modified hydrodesulfurization catalysts—II. Dispersion state and catalytic activity of molybdena supported on titania-alumina carrier", Applied Catalysis, 1991, pp. 179-191, vol. 75.

*Primary Examiner* — Ellen M McAvoy
*Assistant Examiner* — Chantel L Graham
(74) *Attorney, Agent, or Firm* — The Webb Law Firm

(57) ABSTRACT

Provided is a hydrotreating catalyst for a heavy hydrocarbon oil, the catalyst including an inorganic oxide carrier including alumina as a main component and a metal component supported on the inorganic oxide carrier, the catalyst having a specific surface area within a predetermined range, a reduction peak temperature that is lower than 450° C. in temperature-programmed reduction measurement of the catalyst and that is higher than or equal to a predetermined temperature, and an amount of nitrogen monoxide adsorbed on the sulfided catalyst within a predetermined range.

8 Claims, 1 Drawing Sheet

(51) Int. Cl.
*B01J 21/04* (2006.01)
*B01J 35/10* (2006.01)
*B01J 37/02* (2006.01)
*B01J 37/08* (2006.01)
*C10G 45/08* (2006.01)

(52) U.S. Cl.
CPC ....... *B01J 35/1019* (2013.01); *B01J 35/1042* (2013.01); *B01J 35/1047* (2013.01); *B01J 35/1061* (2013.01); *B01J 37/0201* (2013.01); *B01J 37/088* (2013.01); *C10G 2300/202* (2013.01); *C10G 2300/205* (2013.01); *C10G 2300/301* (2013.01); *C10G 2300/308* (2013.01); *C10G 2300/4006* (2013.01); *C10G 2300/4012* (2013.01); *C10G 2300/4018* (2013.01)

(56) References Cited

U.S. PATENT DOCUMENTS

| | | | | |
|---|---|---|---|---|
| 2018/0104676 A1* | 4/2018 | Yamane | ............... | C10G 45/08 |
| 2022/0072517 A1* | 3/2022 | Matsumoto | ............ | C10G 45/06 |

FOREIGN PATENT DOCUMENTS

| | | | |
|---|---|---|---|
| JP | 2006061845 A | 3/2006 |
| JP | 2016203074 A | 12/2016 |
| JP | WO2016189982 A1 | 3/2018 |
| WO | 2016189982 A1 | 12/2016 |

\* cited by examiner

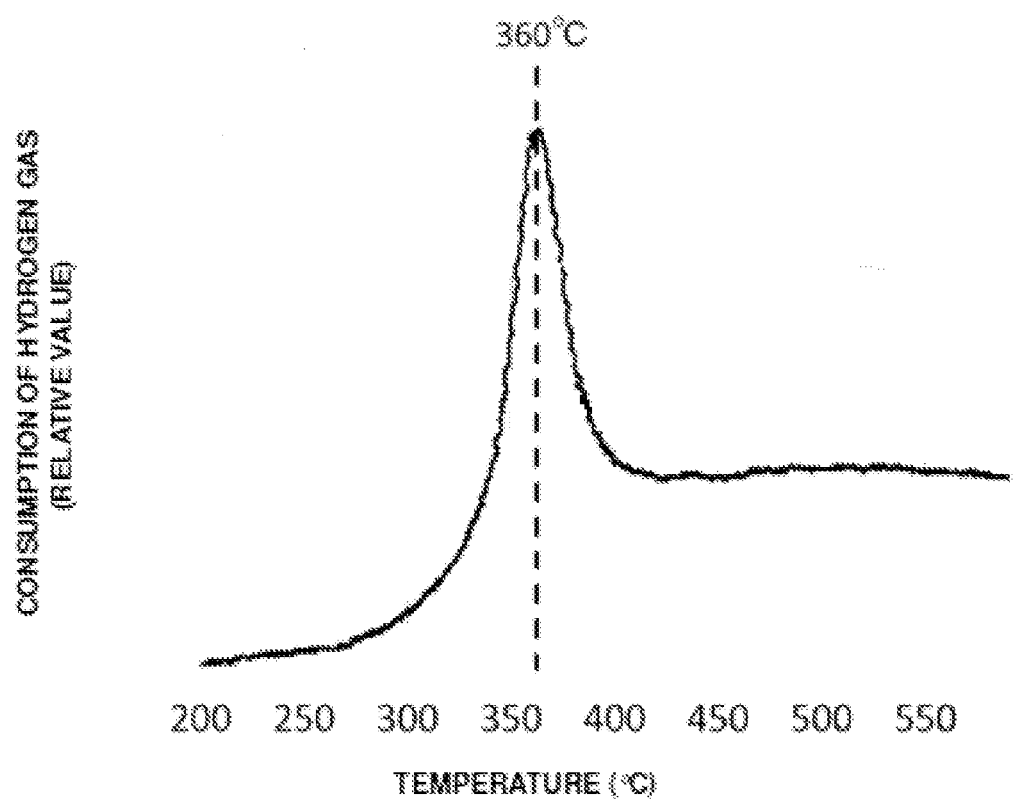

HYDROTREATING CATALYST FOR HEAVY HYDROCARBON OIL, METHOD FOR PRODUCING THE SAME, AND METHOD FOR HYDROTREATING HEAVY HYDROCARBON OIL

CROSS-REFERENCE TO RELATED APPLICATION

This application claims priority to Japanese Patent Application No. 2020-185379 filed Nov. 5, 2020, the disclosures of which are hereby incorporated by reference in their entirety.

BACKGROUND OF THE INVENTION

1. Field of the Invention

The present invention relates to a hydrotreating catalyst configured to efficiently remove, for example, a sulfur component in a heavy hydrocarbon oil (hereinafter, also referred to as a "heavy oil") in the presence of hydrogen, a method for producing the catalyst, and a method for hydrotreating a heavy hydrocarbon oil.

2. Description of the Related Art

In recent years, further improvements in catalytic performance have been required in processes of hydrotreating heavy oils in order to cope with heavier feedstock oils and increased throughput in heavy oil hydrotreaters. In view of the foregoing circumstances, there have been advances in the development of hydrotreating catalysts using various approaches.

For example, WO-A 2016/189982 discloses that a hydrodesulfurization catalyst prepared from an alumina-phosphorus carrier containing 0.5% to 2.0% in terms of $P_2O_5$ and having two maximum peaks in a pore diameter range of 6 to 13 nm in a logarithmic differential pore volume distribution measured by a mercury intrusion method exhibits high desulfurization activity in a hydrotreating reaction of atmospheric residue.

JP-A 2006-61845 discloses a method for producing a hydrodesulfurization catalyst for heavy oil by preparing a carrier containing alumina and titania with a water-soluble titanium complex and supporting metal components on the carrier by use of an impregnating solution containing a poly(ethylene glycol). JP-A 2006-61845 also discloses that the catalyst prepared by supporting active metal components on the carrier containing alumina and titania according to the disclosed production method exhibits high desulfurization activity and high abrasion resistance.

JP-A 2004-73912 discloses a hydrotreating catalyst prepared by supporting an active metal component on a silica-alumina carrier which has a structure including a silica layer on an alumina surface, and contains 2% to 40% by weight of silica based on the total weight of the carrier, the hydrotreating catalyst having a first peak in a pore diameter range of 40 to 200 Å and a second peak in a pore diameter range of 200 to 2,000 Å in a pore volume distribution, in other words, having a bimodal distribution. It is also stated that the addition of silica improves the dispersibility of the active component and uniformly distributes a Brönsted acid and a Lewis acid in a high degree of dispersion to increase the cracking activity and desulfurization activity and that the catalyst is effective in improving the desulfurization activity in the hydrotreatment of light oil, improving the desulfurization activity in the hydrocracking of vacuum residue, and inhibiting sedimentation.

In the process for hydrotreating heavy oil, further improvement in desulfurization activity has been an important issue since, for example, the upper limit of the sulfur content of heavy oil for marine fuel has been lowered by the International Maritime Organization in 2020. In addition, it is necessary to cope with an increase in the throughput of a hydrotreater for heavy oil.

It is known that a measure to improve the performance of a hydrotreating catalyst is to focus on the reduction temperature of an active metal, which is supported on a carrier, under a stream of hydrogen.

JP-A 2002-210362 discloses that the addition of a noble metal, such as rhodium, palladium, or platinum, selected from elements in groups 8 to 10 of the periodic table to a sulfide catalyst containing a base metal element, which is iron, cobalt, or nickel, selected from elements in groups 8 to 10 of the periodic table provides high hydrotreating performance with hydrogen spillover. It is also stated that the behavior of the catalyst components, serving as the reaction active sites, subjected to reduction is closely related to the catalytic activity of the hydrotreatment, and that the temperatures of reduction peaks attributed to iron, cobalt, and nickel of the catalyst under hydrogen flow are desirably 500° C. or lower.

JP-A 2016-203074 discloses that a catalyst in which 15 to 30 parts by mass of at least one active metal of molybdenum and tungsten and 3 to 7 parts by mass of at least one metal component of cobalt and nickel are supported as active metals on an inorganic oxide carrier and in which the peak temperature of desorbed water measured by a temperature-programmed reduction method in the temperature range up to 450° C. is 412.0° C. or lower exhibits high desulfurization activity because the sulfurization treatment of molybdenum can be proceeded sufficiently.

Catalysts produced by preparing alumina-titania mixed carriers each having different amounts of titania added and supporting molybdenum serving as an active metal thereon are reported (see Wei Zhaobin et al., Applied Catalysis, 75(1991), 179-191). It is also stated that the addition of titania decreased the temperature of a reduction peak attributed to molybdenum measured by the temperature-programmed reduction method and increased the hydrogen consumption, indicating that the reduction of molybdenum species is promoted by the addition of titania and that the catalyst containing the active metal in such a more reduced state has higher hydrodesulfurization activity.

The effect of the presence or absence of ethylenediaminetetraacetic acid (EDTA) in supporting nickel and molybdenum on a silica-alumina carrier on hydrodesulfurization activity and the results of measurement by a temperature-programmed reduction method are reported (see Khalida Al-Dalama et al., Thermochimica Acta, 520(2011), 64-74). It is stated that the addition of EDTA may promote the reduction of active metal species to improve the hydrodesulfurization activity.

SUMMARY OF THE INVENTION

Existing catalysts disadvantageously have insufficient activity for use in the hydrotreatment of heavy oil or are disadvantageously inappropriate in terms of catalytic activity and expensive because of the excessive amount of metal components supported.

It is an object of the present invention to provide a hydrotreating catalyst for a heavy oil and a method for producing the same, the hydrotreating catalyst having higher catalytic performance (for example, desulfurization performance, denitrogenation performance, and residual carbon removal performance) than hydrotreating catalysts of the related art. It is another object of the present invention to provide a method for hydrotreating a heavy oil with higher performance (for example, desulfurization performance, denitrogenation performance, and residual carbon removal performance) than hydrotreating methods of the related art.

The present inventors have conducted intensive studies to solve the above problems and have found that a catalyst that exhibits a reduction peak in a specific temperature range in the temperature-programmed reduction measurement of the catalyst has higher removal performance of sulfur, nitrogen, and residual carbon than catalysts of the related art in the hydrotreating of a heavy oil.

The present invention relates to, for example, [1] to [9] below.

[1] A hydrotreating catalyst for a heavy hydrocarbon oil, including:
an inorganic oxide carrier including alumina as a main component and an additive oxide component, and
a metal component supported on the inorganic oxide carrier,
the metal component containing molybdenum and containing nickel and/or cobalt,
the catalyst having:
a molybdenum content of 5% to 16% by mass on an oxide basis, and a total nickel and cobalt content of 1% to 6% by mass on an oxide basis,
a specific surface area measured by a nitrogen adsorption method of 150 to 320 $m^2/g$,
a value of a reduction peak temperature (° C.) that is lower than 450° C. in temperature-programmed reduction measurement of the catalyst and that is higher than or equal to a value A (° C.) given by the following equation:
the value A (° C.)=1.0×(the molybdenum content (% by mass) of the catalyst in terms of $MoO_3$)+25×(the ratio of the cobalt content (% by mass) of the catalyst in terms of CoO to the sum (% by mass) of the nickel content of the catalyst in terms of NiO and the cobalt content of the catalyst in terms of CoO)+339, and
after sulfurization treatment of the catalyst, an amount of nitrogen monoxide adsorbed of 4.0 mL/g or more when a mole ratio (Ni/(Ni+Co)) of the amount of nickel to the total amount of nickel and cobalt in the catalyst is 0.5 or more, and the amount of nitrogen monoxide adsorbed of 5.0 mL/g or more when the mole ratio is less than 0.5.

[2] The hydrotreating catalyst for a heavy hydrocarbon oil described in [1],
wherein the inorganic oxide carrier contains 1% to 30% by mass of the additive oxide component, and
the additive oxide component contains at least an oxide of any one of additive element(s) (a) to (c) below:
(a) magnesium or boron,
(b) a combination of silicon and at least one element(s) M selected from the group consisting of titanium, zirconium, boron, magnesium, and phosphorus, the ratio of silicon to the element(s) M being 0.4 to 3.5 in terms of (mass of silica)/(mass of the oxide of the element(s) M), and
(c) a combination of titanium and phosphorus or a combination of zirconium and phosphorus.

[3] The hydrotreating catalyst for a heavy hydrocarbon oil described in [1] or [2], wherein the inorganic oxide carrier satisfies that:

the average pore diameter (PD) measured by a mercury intrusion method is 9.0 to 15.0 nm,
the sum of pore volumes of pores having a pore diameter in a range of ±2 nm of the average pore diameter is 50% or more of the total pore volume,
the sum of pore volumes of pores having a pore diameter in a range of 20 nm or more is 10% or less of the total pore volume, and
the pore volume (PV) measured by a pore-filling method with water is 0.5 to 1.1 mL/g.

[4] A method for producing the hydrotreating catalyst for a heavy hydrocarbon oil described in [1], the method including the steps of:
(1) preparing a slurry containing a precursor of the inorganic oxide carrier and having a pH of 7 to 10 and then shaping the precursor;
(2) calcining the shaped precursor at 400° C. to 800° C. to provide the inorganic oxide carrier;
(3) preparing an impregnating solution including a raw material for the metal component, an acid, and water, and impregnating the inorganic oxide carrier with the impregnating solution to support the raw material for the metal component on the inorganic oxide carrier; and
(4) calcining the inorganic oxide carrier supporting the raw material for the metal component at 400° C. to 800° C. to provide the hydrotreating catalyst, wherein the step (1) includes:
an operation (1-1) of adding an aqueous solution (b) containing a basic aluminum salt to an aqueous solution (a) containing an acidic aluminum salt and having a pH of 2 to 5 to prepare a slurry of the precursor containing alumina hydrate; and
an operation (1-2) of mixing the alumina hydrate and/or a raw material for the alumina hydrate with a raw material for the additive oxide component.

[5] The method for producing the hydrotreating catalyst for a heavy hydrocarbon oil described in [4], wherein in the operation (1-2),
(i) an aqueous solution of the acidic aluminum salt is mixed with the raw material for the additive oxide component to prepare the aqueous solution (a),
(ii) an aqueous solution of the basic aluminum salt is mixed with the raw material for the additive oxide component to prepare the aqueous solution (b),
(iii) the aqueous solution (a), the aqueous solution (b), and the raw material for the additive oxide component are mixed together to prepare the slurry containing the precursor, or
(iv) the slurry containing the alumina hydrate is mixed with the raw material for the additive oxide component to prepare the slurry containing the precursor.

[6] A method for hydrotreating a heavy hydrocarbon oil including a step of:
hydrotreating the heavy hydrocarbon oil in the presence of the hydrotreating catalyst described in any of [1] to [3].

[7] The method for hydrotreating a heavy hydrocarbon oil described in [6], wherein the heavy hydrocarbon oil has a density of 0.90 to 1.05 $g/cm^3$ and a sulfur content of 1% to 6% by mass and contains 80% or more by mass of a component having a boiling point of 360° C. or higher.

[8] The method for hydrotreating a heavy hydrocarbon oil described in [6] or [7], wherein the step of hydrotreating the heavy hydrocarbon oil is performed at a hydrogen partial pressure of 5.0 to 20 MPa, a reaction temperature of 350° C. to 420° C., and a liquid hourly space velocity of 0.1 to 0.5 $hr^{-1}$.

[9] The method for hydrotreating a heavy hydrocarbon oil described in any of [6] to [8], wherein the method is performed as pretreatment of fluidized-bed catalytic cracking of the heavy hydrocarbon oil.

In the development of hydrotreating catalysts utilizing temperature-programmed reduction measurement in the related art, it was thought that a decrease in the reduction peak temperature of a metal component, i.e., promotion of the reduction of the metal component on a carrier by the addition of a second component to the carrier or the addition of an organic substance to an impregnating solution, was important to improve the catalytic performance. In contrast, the technical idea of the present invention is that a catalyst in which the reduction of a metal component is inhibited is considered to be suitable for the hydrotreatment of a heavy oil.

The present inventors have conducted intensive studies based on the above idea and have found that a catalyst according to an embodiment of the present invention has characteristic properties, such as a characteristic reduction peak temperature and a characteristic amount of nitrogen monoxide adsorbed, and exhibits high performance in actual hydrotreatment of a heavy oil. Moreover, the present inventors have found that such a catalyst is produced by the use of a specific composite oxide carrier, rather than alumina or alumina-phosphorus carriers, which are widely used in hydrotreating catalysts of the related art, and have completed the present invention.

The hydrotreatment of a heavy oil with the hydrotreating catalyst according to an embodiment of the present invention yields a product oil having a low sulfur content, a low nitrogen content, and a low residual carbon content, which have never been achieved with hydrotreating catalysts for heavy oil in the related art. Moreover, such a product oil is industrially important because it can be a suitable feedstock oil for a fluidized-bed catalytic cracking reactor for a heavy oil and can decrease the yield of low-value-added heavy residual oil components in the catalytic cracking reactor.

The hydrotreating catalyst according to an embodiment of the present invention is inexpensive because it does not require any of noble metals as a metal component, and can be used industrially for the hydrotreatment of a heavy oil.

When the catalyst according to an embodiment of the present invention is produced, the production process does not require any major changes or modifications from a production process of a catalyst of the related art. Thus, in the production method according to an embodiment of the present invention, a hydrotreating catalyst for a heavy oil can be produced with improved performance while maintaining high productivity, using the same apparatus as that for producing a catalyst of the related art.

Although the reason why the catalyst of the present invention, in which the reduction of the metal component is inhibited, is suitable for the hydrotreatment of a heavy oil is not fully understood, the present inventors conceive the following mechanism. Note that the present invention is not limited to the hypothesized mechanism described below.

In the hydrotreatment of hydrocarbon oils, for example, various feedstock oils, such as naphtha, kerosene, light oil, and vacuum gas oil, the hydrotreatment of a heavy oil has been operated under particularly severe conditions, and coke formation and aggregation of the metal component may proceed easily because of the operation at high temperatures. It is presumed that when the reduction peak temperature of the catalyst is higher than or equal to a predetermined temperature, i.e., when the metal component is not easily reduced, the metal component species on the carrier has improved stability, which is effective in inhibiting coke poisoning on the metal of the metal component and inhibiting the aggregation of the metal component species, thereby maintaining the function of the active sites for a longer period of time.

BRIEF DESCRIPTION OF THE DRAWING

FIGURE illustrates the measurement results of the reduction temperature of the metal component of catalyst (7) in Example 1 by a temperature-programmed reduction method.

DESCRIPTION OF THE PREFERRED EMBODIMENTS

Embodiments of the present invention will be described below.

Embodiments of the present invention provide a hydrotreating catalyst for a heavy oil, a method for producing the hydrotreating catalyst, and a method for hydrotreating a heavy oil. The catalyst produced in accordance with an embodiment of the present invention (hereinafter, also referred to as a "present catalyst") can be placed and used in any area of a demetallization section, a desulfurization section, and a transition section provided therebetween in a hydrotreater for a heavy oil. The catalyst can be suitably used particularly in the desulfurization section.

In the demetallization section of the hydrotreater for a heavy oil, demetallization with a demetallization catalyst is mainly performed in the presence of hydrogen gas to remove metal components in a feedstock oil. In the desulfurization section, a hydrogenation reaction is mainly performed with a desulfurization catalyst in the presence of hydrogen gas to remove sulfur components, nitrogen components, and residual carbon components.

[Hydrotreating Catalyst]

The hydrotreating catalyst according to an embodiment of the present invention is a catalyst used for the hydrotreatment of a heavy hydrocarbon oil, includes an inorganic oxide carrier composed of alumina as a main component and a metal component supported on the inorganic oxide carrier, has a specific surface area in a predetermined range, has a reduction peak temperature that is lower than 450° C. in a temperature-programmed reduction measurement of the catalyst and that is higher than or equal to a predetermined temperature, and has an amount of nitrogen monoxide adsorbed after the sulfurization treatment of the catalyst in a predetermined range.

<Inorganic Oxide Carrier>

The inorganic oxide carrier used in the catalyst according to an embodiment of the present invention is a carrier that is mainly composed of alumina and that contains an additive oxide component.

The inorganic oxide carrier preferably contains 70% to 99% by mass, more preferably 75% to 98% by mass, even more preferably 80% to 97% by mass aluminum on an oxide ($Al_2O_3$) basis.

The inorganic oxide carrier, which is mainly composed of alumina within the above composition range, is suitable as a carrier for the hydrotreating catalyst because the carrier has a high specific surface area, a pore diameter suitable for the treatment of a heavy oil, high crushing strength, high abrasion resistance, and high productivity, such as good suitability for extrusion molding.

The additive oxide component is an oxide of an additive element(s) other than aluminum. A preferred example thereof is an oxide of one of the following additive element(s) (a), (b), and (c):

(a) magnesium or boron,
(b) a combination of silicon and at least one element(s) M selected from the group consisting of titanium, zirconium, boron, magnesium, and phosphorus, the ratio of silicon to the element(s) M being 0.4 to 3.5 in terms of (mass of silica)/(mass of the oxide of the element(s) M), and
(c) a combination of titanium and phosphorus or a combination of zirconium and phosphorus.

The inorganic oxide carrier preferably contains 1% to 30% by mass, more preferably 2% to 25% by mass, even more preferably 3% to 20% by mass of the above-mentioned additive element(s) on an oxide basis.

The description that the inorganic oxide carrier contains alumina and the additive oxide component usually indicates that the inorganic oxide contains a composite oxide of aluminum and the additive element(s).

The inorganic oxide carrier preferably satisfies requirements (i) and (ii) below. More preferably, the inorganic oxide carrier further satisfies requirement (iii) below.
Requirement (i): The average pore diameter (PD) measured by a mercury intrusion method is in the range of 9.0 to 15.0 nm, preferably 9.0 to 14.0 nm.
Requirement (ii): The sum of pore volumes of pores having a pore diameter in a range of ±2 nm of the average pore diameter is 50% or more, preferably 55% or more of the total pore volume. Requirement (iii): The sum of pore volumes of pores having a pore diameter in a range of 20 nm or more is 10% or less of the total pore volume.

In addition, the inorganic oxide carrier preferably satisfies requirement (iv) below.
Requirement (iv): The pore volume (PV) measured by a pore-filling method with water is 0.5 to 1.1 mL/g, preferably 0.6 to 1.0 mL/g.

The details of measurement methods for the physical properties are described in the EXAMPLES section below.

The catalyst containing the inorganic oxide carrier having the components and the composition is considered to have superior catalytic performance because it has both high diffusibility of a heavy oil having a relatively large molecular size and a high specific surface area, which is important to maintain the dispersion of a metal component in a solid catalyst.

<Metal Component>

A catalyst according to an embodiment of the present invention includes a metal component supported on the inorganic oxide carrier. The metal component contains molybdenum and contains nickel and/or cobalt.

The catalyst according to an embodiment of the present invention has a molybdenum content of 5% to 16% by mass, preferably 6% to 15% by mass in terms of oxide ($MoO_3$).

The catalyst according to an embodiment of the present invention has a total nickel and cobalt content of 1.0% to 6.0% by mass, preferably 1.5% to 5.0% by mass in terms of oxides (NiO and CoO).

<Specific Surface Area>

The catalyst according to an embodiment of the present invention has a specific surface area of 150 to 320 $m^2/g$ as measured by a nitrogen adsorption method (details of the measurement method are described in the Examples section below).

A specific surface area of less than 150 $m^2/g$ may result in insufficient dispersion of the metal component on the inorganic oxide carrier and the formation of aggregates of the metal component, which is not preferred. A specific surface area of the catalyst of more than 320 $m^2/g$ results in a smaller pore diameter, which is not preferred in a reaction using a heavy oil having a large molecular size as a feedstock oil because the diffusibility of molecules of the heavy oil is deteriorated.

<Reduction Peak Temperature>

The present inventors have attempted to develop a novel hydrotreating catalyst for a heavy oil on the basis of temperature-programmed reduction measurement of the catalyst and have found that a catalyst that exhibits a high reduction peak temperature higher than or equal to a certain level has high performance for the hydrotreatment of a heavy oil, compared with catalysts prepared using alumina carriers that have been used by those skilled in the art. The present inventors have further found that the reduction peak temperature correlates with the amount of molybdenum and the ratio of the amount of cobalt to the total amount of nickel and cobalt in the catalyst. These findings have led them to propose the following conditions.

A catalyst in which the value (° C.) of the reduction peak temperature lower than 450° C. in the temperature-programmed reduction measurement of the catalyst according to an embodiment of the present invention is greater than or equal to a value A calculated from equation (1) below, preferably greater than or equal to a value A' calculated from equation (1') below, more preferably greater than or equal to a value A" calculated from equation (1") below, exhibits high catalytic activity in the hydrotreatment of a heavy oil.

$$\text{Value } A(° \text{C.}) = 1.0 \times B + 25 \times C + 339 \qquad (1)$$

$$\text{Value } A'(° \text{C.}) = 1.0 \times B + 25 \times C + 340 \qquad (1')$$

$$\text{Value } A''(° \text{C.}) = 1.0 \times B + 25 \times C + 342 \qquad (1'')$$

In equations (1), (1'), and (1"), each B denotes the molybdenum content (% by mass) of the catalyst in terms of $MoO_3$, and each C denotes the ratio of the cobalt content (% by mass) of the catalyst in terms of CoO to the sum (% by mass) of the nickel content of the catalyst in terms of NiO and the cobalt content of the catalyst in terms of CoO.

The details of the temperature-programmed reduction measurement and the reduction peak temperature are described in the EXAMPLES section below.

The value of the reduction peak temperature of the catalyst greater than or equal to the value A, preferably greater than or equal to the value A', more preferably greater than or equal to the value A" indicates that the metal component on the catalyst is less likely to be reduced than catalysts prepared using carriers containing alumina and additive oxide components in the related art. The catalyst according to an embodiment of the present invention with such a reduction peak temperature is suitable as a catalyst for use in the desulfurization of a heavy oil because the structure and the function of the active sites are easily maintained to result in high hydrotreating activity.

Equations (1), (1'), and (1") were obtained from the findings that a larger amount of $MoO_3$ in the catalyst results in a higher reduction peak temperature and a higher ratio of the amount of CoO to the total amount of NiO and CoO in the catalyst results in a higher reduction peak temperature, and from the comparative evaluation of the reduction peak temperature and hydrotreating performance of the catalyst according to an embodiment of the present invention and catalysts produced in comparative examples.

An example of a method for producing a catalyst having such a reduction peak temperature is, but not limited to, a method for producing a hydrotreating catalyst described below.

The upper limit of the reduction peak temperature may be, for example, about (value A+10°) C.

<Amount of Nitrogen Monoxide Adsorbed>

The dispersibility of the metal component of the hydrotreating catalyst can be evaluated by measuring the amount of nitrogen monoxide adsorbed on the catalyst that has been subjected to sulfurization treatment. The details of the sulfurization treatment and the measurement method are described in the EXAMPLES section below. The structure of the supported metal component varies in accordance with the mole ratio of nickel to nickel and cobalt. Typically, a higher mole ratio of nickel is considered to lead to a smaller amount of nitrogen monoxide adsorbed.

The amount of nitrogen monoxide adsorbed by the catalyst according to an embodiment of the present invention after sulfurization treatment is 4.0 mL/g or more when the mole ratio (Ni/(Ni+Co)) of the amount of nickel to the total amount of nickel and cobalt in the catalyst is 0.5 or more, and is 5.0 mL/g or more when the aforementioned mole ratio is in the range of less than 0.5. A smaller amount of nitrogen monoxide adsorbed than the above range indicates low dispersibility of the metal component on the catalyst, which is not preferred because the number of active sites is small.

The upper limit of the amount of nitrogen monoxide adsorbed may be, for example, about 9.0 mL/g.

The amount of nitrogen monoxide adsorbed can be increased or decreased, for example, by changing the calcination temperature of the carrier or catalyst, or by adding an optional chelating agent to an impregnating solution containing an active metal in a method for producing a hydrotreating catalyst described below.

The properties and shape of the inorganic oxide carrier are appropriately selected in accordance with various conditions, such as the type and composition of the metal component supported and the application of the catalyst.

To effectively support the above metal component on the carrier in a highly dispersed state and to ensure sufficient catalytic activity, a porous carrier having predetermined pores is usually suitable for use. To control the physical properties, such as mechanical strength and heat resistance, of the carrier or catalyst, an appropriate binder component or additive may be incorporated during the formation of the carrier or catalyst.

The carrier may further contain additives other than the above-mentioned additive oxide components. Examples thereof include minerals, such as aluminosilicates, for example, zeolite, talc, kaolinite, and montmorillonite.

Although a method for preparing a carrier is not limited, a catalyst having, for example, improved hydrocracking activity and crushing strength can be produced by adding the above additives to a carrier precursor obtained by a preparation method described below.

[Method for Producing Hydrotreating Catalyst]

A method for producing a hydrotreating catalyst according to an embodiment of the present invention includes the steps of:

(1) shaping a carrier precursor,
(2) calcining the carrier precursor to provide an inorganic oxide carrier,
(3) supporting a raw material for a metal component on the inorganic oxide carrier, and
(4) calcining the inorganic oxide carrier supporting the raw material for the metal component to provide a hydrotreating catalyst.

(Step (1))

The step (1) is a step of preparing a slurry containing a precursor of the inorganic oxide carrier (hereinafter, also referred to as a "carrier precursor") and having a pH of 7 to and then shaping the carrier precursor, and includes an operation (1-1) of adding an aqueous solution (b) containing a basic aluminum salt to an aqueous solution (a) containing an acidic aluminum salt to prepare the carrier precursor containing alumina hydrate, and an operation (1-2) of mixing the alumina hydrate and/or its raw materials with raw materials for the additive oxide component (hereinafter, also referred to as "additive oxide component raw materials").

The operation (1-2) is performed together with or separately from the operation (1-1) in accordance with a specific embodiment.

The carrier precursor includes the alumina hydrate and the additive oxide component raw materials.

<<Operation (1-1)>>

In the operation (1-1), the aqueous solution (b) containing the basic aluminum salt is added to the aqueous solution (a) containing the acidic aluminum salt to prepare a slurry of the carrier precursor containing the alumina hydrate.

The aqueous solution (a) containing the acidic aluminum salt is prepared, for example, by adding the acidic aluminum salt to water.

The aqueous solution (a) is prepared in such a manner that the aluminum content is, for example, 0.1% to 2.0% by mass in terms of $Al_2O_3$ and the pH is 2.0 to 5.0. The aqueous solution is heated to a solution temperature of, for example, 50° C. to 80° C. under stirring.

The acidic aluminum salt is a water-soluble salt. Examples thereof include aluminum sulfate, aluminum chloride, aluminum acetate, and aluminum nitrate.

When the acidic aluminum salt is added to water to prepare the aqueous solution (a), the acidic aluminum salt is preferably added in the form of an aqueous solution containing 0.5% to 20% by mass aluminum in terms of $Al_2O_3$.

Then, the aqueous solution (b) containing the basic aluminum salt is added to the aqueous solution (a) containing the acidic aluminum salt over a period of, for example, 30 to 200 minutes under stirring in such a manner that the pH is 7 to 10, thereby preparing a slurry of a carrier precursor containing alumina hydrate.

The alumina hydrate is washed with deionized water having a temperature of, for example, 40° C. to 70° C. to remove by-product salts, which are impurities containing, for example, sodium or sulfate radicals, thereby yielding a cake-like alumina hydrate.

Examples of the basic aluminum salt include sodium aluminate and potassium aluminate. The aqueous solution of the basic aluminum salt preferably contains 2% to 30% by mass of aluminum in terms of $Al_2O_3$.

<<Operation (1-2)>>

In the operation (1-2), the alumina hydrate and/or its raw materials are mixed with the additive oxide component raw materials.

Examples of the embodiment of mixing the raw materials for the alumina hydrate and the raw materials for the additive oxide component include:

(i) mixing an aqueous solution of the acidic aluminum salt with the raw materials for the additive oxide component to prepare the aqueous solution (a);

(ii) mixing an aqueous solution of the basic aluminum salt with the raw materials of the additive oxide component to prepare the aqueous solution (b);

(iii) mixing the aqueous solution (a), the aqueous solution (b), and the raw materials for the additive oxide component together to prepare a slurry containing the precursor; and (iv) mixing the slurry containing the alumina hydrate with the raw materials for the additive oxide component to prepare the slurry containing the precursor.

Examples of the embodiment (i) include adding the above-mentioned additive oxide component raw materials to water when alumina hydrate is prepared; and adding the above-mentioned additive oxide component raw materials to the aqueous solution of the acidic aluminum salt.

Examples of the embodiment (ii) include adding the above-mentioned additive oxide component raw materials to the aqueous solution of the basic aluminum salt.

Examples of the embodiment (iv) include adding the additive oxide component raw materials to the slurry after the preparation of the alumina hydrate; adding the additive oxide component raw materials to the alumina hydrate after washing and desalting; adding the additive oxide component raw materials to the alumina hydrate after high-temperature aging; and adding the additive oxide component raw materials to the alumina hydrate during kneading in a kneader.

The specific embodiment of the operation (1-2) is not limited thereto, and is selected in accordance with various conditions, such as the type and composition of the component added, and the application of the catalyst.

Examples of the additive oxide component raw materials include water-soluble salts, oxide powders, oxide or hydroxide sols, and oxide or hydroxide gels.

Examples of phosphorus-containing additive oxide component raw materials include phosphate compounds, such as ammonium phosphate, potassium phosphate, sodium phosphate, phosphoric acid, and phosphorous acid, which produce phosphate or phosphite ions in water.

Examples of silicon-containing additive oxide component raw materials include sodium silicate, silicon tetrachloride, silica powders, silica sols, and silica gels. Sodium silicate is particularly preferred because it is inexpensive.

Examples of titanium-containing additive oxide component raw materials include titanium tetrachloride, titanium trichloride, titanium sulfate, titanyl sulfate, titanium nitrate, titanium hydroxide gels, metatitanic acid, and titania powders. Titanium sulfate and titanyl sulfate are particularly preferred because they are inexpensive.

Examples of zirconium-containing additive oxide component raw materials include zirconium sulfate, zirconium acetate, zirconium nitrate, zirconium oxychloride, zirconium carbonate, and zirconia powders.

Examples of boron-containing additive oxide component raw materials include boric acid, ammonium borate, sodium borate, and aluminum borate.

Examples of magnesium-containing additive oxide component raw materials include magnesium oxide, magnesium hydroxide, and magnesium sulfate.

<Additives>

If necessary, at least one organic additive selected from organic acids and sugars may be added to the resulting slurry of the carrier precursor, and then the carrier precursor may be aged. Examples of organic acids include citric acid, malic acid, tartaric acid, gluconic acid, acetic acid, ethylenediaminetetraacetic acid (EDTA), and diethylenetriamine pentaacetic acid (DTPA). Examples of sugars include monosaccharides, disaccharides, and polysaccharides.

<<<Shaping of Carrier Precursor>>>

The carrier precursor containing alumina hydrate and the additive oxide component raw materials are placed in, for example, a steam-jacketed double-arm kneader, heated, and kneaded to prepare a formable kneaded material. Then the kneaded material is formed into a desired shape, such as a cylindrical, trilobal, or quadrilobal shape, by extrusion molding, for example.

(Step (2))

In the step (2), the formed article of the carrier precursor produced in the step (1) is calcined to produce an inorganic oxide carrier. The formed article may be dried by heating at, for example, 70° C. to 150° C., preferably 90° C. to 130° C., before the calcination. The calcination temperature is, for example, 400° C. to 800° C., preferably 400° C. to 600° C. The calcination time is, for example, 0.5 to 10 hours, preferably 2 to 5 hours. An insufficient calcination temperature causes the organic additives to remain or causes the average pore diameter to decrease, which is not preferred. An excessively high calcination temperature results in a decrease in specific surface area, which is not preferred.

(Step (3))

In the step (3), an impregnating solution including the raw material for the metal component, an acid, and water is prepared, and then the inorganic oxide carrier is impregnated with the impregnating solution to support the raw material for the metal component on the inorganic oxide carrier.

<Raw Material for Metal Component>

The resulting carrier is brought into contact with the impregnating solution containing the raw material for the metal component. Examples of the raw material for the metal component include molybdenum trioxide, ammonium molybdate, cobalt nitrate, cobalt carbonate, nickel nitrate, and nickel carbonate.

The amount of raw material for the metal component is set in such a manner that the amount of molybdenum and the amount of nickel and/or cobalt in the hydrotreating catalyst to be produced are within the ranges described above. The amount or composition of the raw material for the metal component is appropriately selected in accordance with the type of feedstock oil to be subjected to hydrotreatment or the application of the product oil.

When the raw material for the metal component is supported on the inorganic oxide carrier, the impregnating solution in which the raw material for the metal component is dissolved is prepared, and then the raw material is supported on the carrier.

<Impregnating Solution>

When the impregnating solution is prepared, preferably, an inorganic acid or organic acid is used to set the pH of the impregnating solution to 4 or less, thereby dissolving the raw material for the metal component. Examples of inorganic acids include phosphoric acid and nitric acid. Examples of phosphoric acids that can be used include phosphoric acid, ammonium dihydrogen phosphate, diammonium hydrogen phosphate, trimetaphosphoric acid, pyrophosphoric acid, and tripolyphosphoric acid. Examples of organic acids that can be used include citric acid, malic acid, tartaric acid, acetic acid, ethylenediaminetetraacetic acid (EDTA), and diethylenetriamine pentaacetic acid (DTPA). In particular, citric acid or malic acid are suitably used.

(Step (4))

In the step (4), the inorganic oxide carrier on which the raw material for the metal component is supported is calcined to produce the hydrotreating catalyst according to an embodiment of the present invention.

The calcination temperature is, for example, 400° C. to 800° C., preferably 400° C. to 700° C., more preferably 450° C. to 650° C. The calcination time is, for example, 0.5 to 10 hours, preferably to 8 hours. An excessively high calcination temperature results in a deterioration in catalytic activity due to the aggregation of the metal component, which is not preferred.

The hydrotreating catalyst according to an embodiment of the present invention described above can be produced by a method for producing a hydrotreating catalyst according to an embodiment of the present invention.

[Hydrotreating Method]

A method for hydrotreating a heavy hydrocarbon oil (heavy oil) according to an embodiment of the present invention includes a step of hydrotreating a heavy hydrocarbon oil (heavy oil) in the presence of a hydrotreating catalyst according to an embodiment of the present invention.

The heavy oil to be treated with the catalyst according to an embodiment of the present invention is mainly composed of a distillation residue of crude oil. The heavy oil has a wider molecular weight distribution than kerosene and gas oil fractions, and the characteristics of the heavy oil vary greatly, depending on the origin of the crude oil. Typical heavy oils from the Middle East and Central and South America have a high sulfur content or a high asphaltene content. Such heavy oils having a high asphaltene content contain high levels of residual carbon and impurity metals, such as vanadium and nickel. Heavy oils are subjected to a hydrorefining process with a hydrotreater for heavy oils and can be used as feedstocks for low-sulfur heavy oils or feedstocks for residue fluid catalytic crackers (RFCCs).

Examples of the above heavy oils include, but are not limited to, high-density petroleum fractions, such as atmospheric residue (AR) and vacuum residue (VR) of crude oil, catalytic cracking residue, visbreaking oil, and bitumen. These heavy oils usually contain more than 1% by mass asphaltene. Asphaltene extracted from these heavy oils can also be used as feedstock oil. In an embodiment of the present invention, these may be used alone or in combination, as feedstock oil. For example, coker oil, synthetic crude oil, naphtha-cut crude oil, heavy gas oil, vacuum gas oil, LCO, gas-to-liquid (GTL) oil, or wax can be mixed with, for example, atmospheric residue, and the resulting mixture can be used as heavy oil for hydrotreatment.

Regarding the distillation characteristics of a feedstock heavy oil, a heavy oil having a density of 0.90 to 1.05 g/cm³ and a sulfur content (sulfur concentration) of 1% to 6% by mass and containing 80% by mass of a component having a boiling point of 360° C. or higher is preferably used. The nitrogen content (nitrogen concentration) of the feedstock heavy oil is preferably more than 2,000 ppm by mass and 10,000 ppm or less by mass.

The hydrotreatment with the catalyst according to an embodiment of the present invention is performed, for example, by filling a fixed-bed reactor with the catalyst in such a manner that the catalyst is stacked to form a demetallization section, a transition section, and a desulfurization section in the distribution direction, and passing heavy oil through the reactor in a hydrogen atmosphere under high-temperature and high-pressure conditions.

The resulting processed oil is subjected to a catalytic cracking process with a fluid catalytic cracker, as needed. The catalytic cracking process with the fluid catalytic cracker may be performed using any known method and conditions with no particular limitations. For example, an amorphous catalyst, such as silica-alumina or silica-magnesia, or a zeolite catalyst, such as faujasite-type crystalline aluminosilicate, is used. A reaction temperature of about 450° C. to about 650° C., preferably 480° C. to 580° C., a regeneration temperature of about 550° C. to about 760° C., and a reaction pressure of about 0.1 MPa to about MPa, preferably 0.2 MPa to 2 MPa, may be selected, as appropriate. The product oil subjected to the catalytic cracking process with the fluid catalytic cracker, which is the final step, can be used as a feedstock for fuels and petrochemicals.

EXAMPLES

Although the present invention will be described in more detail by means of examples, the present invention is not limited to these examples.

<Method for Measuring Carrier Component Contents, Such as Aluminum, Phosphorus, Titanium, Zirconium, Boron, Silicon, and Magnesium Contents) and Metal Component Contents, Such as Molybdenum, Cobalt, and Nickel Contents>

About 10 g of a catalyst for measurement was ground in a mortar. About 0.5 g of the ground sample was collected, heat-treated (200° C., 20 min), and calcined (700° C., 5 min). Then 2 g of $Na_2O_2$ and 1 g of NaOH were added thereto. The mixture was melted for 15 minutes. After dissolving the mixture by adding 25 mL of $H_2SO_4$ and 200 mL of water, the resulting solution was diluted to 500 mL with deionized water to prepare a sample. For the resulting sample, the component contents, excluding aluminum, were each measured on an oxide basis using an inductively coupled plasma (ICP) emission spectrometer (ICPS-8100, available from Shimadzu Corporation, analysis software: ICPS-8000). The aluminum content (in terms of $Al_2O_3$) was determined by subtracting the other component contents from the amount of the measured sample.

<Method for Measuring Surface Area (Specific Surface Area $N_2$) Determined by BET Single-Point Method for Measuring Nitrogen Adsorption/Desorption>

About 30 mL of a catalyst for measurement was collected in a ceramic crucible (B-2 type), heat-treated at 500° C. for 1 hour, placed in a desiccator, and cooled to room temperature to provide a measurement sample. Subsequently, 1 g of this sample was collected, and then the specific surface area ($m^2$/g) of the sample was measured by the BET method using a fully automated surface area measurement device (Model: MultiSorb 12, available from Yuasa Ionics Co., Ltd).

<Method for Measuring Average Pore Diameter of Carrier>

About 3 g of a carrier for measurement was collected in a ceramic crucible, heat-treated at 500° C. for 1 hour, placed in a desiccator, and cooled to room temperature to provide a measurement sample. Measurement was performed by a mercury intrusion method with Poremaster GT-60 available from Quantachrome Instruments (mercury contact angle: 150°, and surface tension: 480 dyn/cm). The average pore diameter was defined as a pore diameter corresponding to 50% of the pore volume.

<Method for Measuring Pore Volume of Carrier>

About 30 g of a carrier for measurement was collected in a ceramic crucible, heat-treated at 500° C. for 1 hour, placed in a desiccator, and cooled to room temperature to provide a measurement sample. The pore volume was measured by a pore-filling method with water.

<Method for Measuring Amount of Nitrogen Monoxide Adsorbed on sulfided Catalyst>

The amount of nitrogen monoxide adsorbed was measured using a fully automated catalyst gas adsorption measurement system (available from Okura Riken Co., Ltd). A mixed gas of helium gas and nitrogen monoxide gas (nitrogen monoxide concentration: 10% by volume) was introduced in pulses to a sulfided hydrotreating catalyst to measure the amount of nitrogen monoxide molecules adsorbed per gram of the hydrotreating catalyst. Specifically, about 0.2 g of the catalyst ground to 60 mesh or less was weighed and filled into a quartz cell. The catalyst was heated to 360° C. and subjected to sulfurization treatment for 1 hour by allowing a mixture containing 5% hydrogen sulfide by volume and 95% hydrogen by volume to flow therethrough at a flow rate of 0.2 L/min. The catalyst was then held at 340° C. for 1 hour to discharge physisorbed hydrogen sulfide from the system. Then nitrogen monoxide molecules were adsorbed with a mixed gas of helium gas and nitrogen monoxide gas at 50° C. The amount of nitrogen monoxide molecules adsorbed was measured with a thermal conductivity detector (TCD).

<Measurement by Temperature-Programmed Reduction Method>

In a temperature-programmed reduction method, a fully automated catalyst gas adsorption measurement system (available from Okura Riken Co., Ltd.) was used. First, 0.05 g of a catalyst that had been granulated to 250 to 710 μm was pretreated at 400° C. for 1 hour under a stream of argon gas and cooled to 50° C. The argon gas was switched to a hydrogen/argon mixed gas having a hydrogen concentration of 65%. The mixed gas was allowed to flow at a feed rate of 24 mL/min. The temperature was increased from 50° C. to 600° C. at 3° C./min. The flowing gas during the temperature increase was analyzed with a thermal conductivity detector (TCD) to obtain the hydrogen gas consumption spectrum. From the hydrogen gas consumption spectrum, the reduction peak temperature of a metal component was read.

FIGURE is a graph of an example of the results of the analysis using the temperature-programmed reduction method. The horizontal axis represents the catalyst sample temperature. The vertical axis represents the relative value of the hydrogen gas consumption. In an embodiment of the present invention, the "reduction peak temperature" refers to the catalyst sample temperature at the point of the highest hydrogen consumption in the temperature range of lower than 450° C., as can be read in the example illustrated in FIGURE.

<Method for Analyzing Hydrocarbon Oil>

The sulfur concentration was measured in accordance with JIS K 2541-7. The nitrogen concentration was measured in accordance with JIS K 2609. The concentrations of metals (nickel and vanadium) were measured in accordance with JPI-5S-62 of the Japan Petroleum Institute. The residual carbon content was measured in accordance with JIS K 2270-2:2009. The density was measured in accordance with JIS K 2249-1. The distillation characteristics were measured in accordance with ASTM D2892.

Production Example 1: Preparation of Carrier D

First, 60.4 kg of deionized water was placed in a tank equipped with a circulation line with two chemical inlets. Then 19.2 kg of an aqueous solution of aluminum sulfate (concentration: 7% by mass in terms of $Al_2O_3$), which was an aqueous solution of an acidic aluminum salt, was added thereto under stirring. The resulting diluted aqueous solution was heated to 60° C. and circulated. The aqueous solution had a pH of 2.3. While stirring the diluted aqueous solution, 5.00 kg of an aqueous solution of titanyl sulfate (concentration: 5% by mass in terms of $TiO_2$) and 1.04 kg of an aqueous solution of sodium silicate (water glass, concentration: 24% by mass in terms of $SiO_2$) were sequentially added to the diluted aqueous solution to prepare an aqueous acidic aluminum salt solution (D1).

Next, 14.3 kg of an aqueous solution of sodium aluminate (concentration: 22% by mass in terms of $Al_2O_3$), which was an aqueous solution of a basic aluminum salt, was added to the aqueous acidic aluminum salt solution (D1) over a period of 60 minutes while the aqueous solution being stirred, circulated, and maintained at 60° C., thereby preparing a slurry. The pH of the slurry was adjusted to 9.5. The pH was adjusted by the addition of a 15% by mass aqueous ammonia solution or a 10% by mass aqueous solution of sulfuric acid, unless otherwise specified, including other production examples and comparative production examples. The resulting alumina-based composite oxide hydrate was washed with deionized water having a temperature of 60° C. to remove impurities, such as sodium and sulfate radicals, thereby providing a washed cake. The washed cake was adjusted to have an $Al_2O_3$ concentration of 8% by mass by the addition of deionized water. The cake was aged at 95° C. for 3 hours in an aging tank equipped with a reflux condenser and dehydrated to provide a cake-like alumina-based composite oxide hydrate (D).

The cake-like alumina-based composite oxide hydrate (D) was kneaded in a steam-jacketed double-arm kneader and concentrated and kneaded until a predetermined moisture content (about 40% to 70%, also in other production examples and comparative production examples) was achieved. The resulting kneaded material was extruded into a quadrilobal columnar shape with a diameter of 1.7 mm using an extruder. The resulting molded articles were dried at 110° C. for 12 hours and then calcined at 500° C. for 3 hours to yield a carrier D. Table 1 presents the chemical composition of the carrier D.

Production Example 2: Preparation of Carrier E

First, 64.1 kg of deionized water was placed in a tank equipped with a circulation line with two chemical inlets. Then 19.2 kg of an aqueous solution of aluminum sulfate (concentration: 7% by mass in terms of $Al_2O_3$), which was an aqueous solution of an acidic aluminum salt, was added thereto under stirring. The resulting diluted aqueous solution was heated to 60° C. and circulated. The diluted aqueous solution had a pH of 2.3. While stirring the diluted aqueous solution, 1.65 kg of an aqueous solution of zirconium sulfate (concentration: 18.2% by mass in terms of $ZrO_2$) and 0.83 kg of an aqueous solution of sodium silicate (concentration: 24% by mass in terms of $SiO_2$) were sequentially added to the diluted aqueous solution to prepare an aqueous acidic aluminum salt solution (E1).

Next, 14.3 kg of an aqueous solution of sodium aluminate (concentration: 22% by mass in terms of $Al_2O_3$), which was an aqueous solution of a basic aluminum salt, was added to the aqueous acidic aluminum salt solution (E1) over a period of 60 minutes while the aqueous solution being stirred, circulated, and maintained at 60° C., thereby preparing a slurry. The pH of the slurry was adjusted to 9.5. The resulting alumina-based composite oxide hydrate was washed with deionized water having a temperature of 60° C. to remove impurities, such as sodium and sulfate radicals, thereby providing a washed cake. The washed cake was adjusted to have an $Al_2O_3$ concentration of 8% by mass by the addition of deionized water. The cake was aged at 95° C. for 3 hours in an aging tank equipped with a reflux condenser and dehydrated to provide a cake-like alumina-based composite oxide hydrate (E).

A carrier E was produced as in Production example 1, except that the alumina-based composite oxide hydrate (D) was changed to the alumina-based composite oxide hydrate (E). Table 1 presents the chemical composition of the carrier E.

Production Example 3: Preparation of Carrier F

First, 63.8 kg of deionized water was placed in a tank equipped with a circulation line with two chemical inlets. Then 20.5 kg of an aqueous solution of aluminum sulfate (concentration: 7% by mass in terms of $Al_2O_3$), which was an aqueous solution of an acidic aluminum salt, was added thereto under stirring. The resulting diluted aqueous solution was heated to 60° C. and circulated. The diluted aqueous solution had a pH of 2.3. While stirring the diluted aqueous solution, 0.08 kg of phosphoric acid (concentration: 61.6% by mass in terms of $P_2O_5$) and 0.63 kg of an aqueous solution of sodium silicate (concentration: 24% by mass in terms of $SiO_2$) were sequentially added to the diluted aqueous solution to prepare an aqueous acidic aluminum salt solution (F1).

Next, 15.3 kg of an aqueous solution of sodium aluminate (concentration: 22% by mass in terms of $Al_2O_3$), which was an aqueous solution of a basic aluminum salt, was added to the aqueous acidic aluminum salt solution (F1) over a period of 60 minutes while the aqueous solution being stirred, circulated, and maintained at 60° C., thereby preparing a slurry. The pH of the slurry was adjusted to 9.5. The resulting alumina-based composite oxide hydrate was washed with deionized water having a temperature of 60° C. to remove impurities, such as sodium and sulfate radicals, thereby providing a washed cake. The washed cake was adjusted to have an $Al_2O_3$ concentration of 10% by mass by the addition of deionized water. The cake was aged at 95° C. for 3 hours in an aging tank equipped with a reflux condenser and dehydrated to provide a cake-like alumina-based composite oxide hydrate (F).

A carrier F was produced as in Production example 1, except that the alumina-based composite oxide hydrate (D) was changed to the alumina-based composite oxide hydrate (F). Table 1 presents the chemical composition of the carrier F.

Production Example 4: Preparation of Carrier G

First, 59.6 kg of deionized water was placed in a tank equipped with a circulation line with two chemical inlets. Then 20.3 kg of an aqueous solution of aluminum sulfate (concentration: 7% by mass in terms of $Al_2O_3$), which was an aqueous solution of an acidic aluminum salt, was added thereto under stirring. The resulting diluted aqueous solution was heated to 60° C. and circulated. The diluted aqueous solution had a pH of 2.3. While stirring the diluted aqueous solution, 5.0 kg of aqueous solution of magnesium sulfate (concentration: 5% by mass in terms of MgO) was added to the diluted aqueous solution to prepare an aqueous acidic aluminum salt solution (G1).

Next, 15.2 kg of an aqueous solution of sodium aluminate (concentration: 22% by mass in terms of $Al_2O_3$), which was an aqueous solution of a basic aluminum salt, was added to the aqueous acidic aluminum salt solution (G1) over a period of 60 minutes while the aqueous solution being stirred, circulated, and maintained at 60° C., thereby preparing a slurry. The pH of the slurry was adjusted to 9.5. The resulting alumina-based composite oxide hydrate was washed with deionized water having a temperature of 60° C. to remove impurities, such as sodium and sulfate radicals, thereby providing a washed cake. The washed cake was adjusted to have an $Al_2O_3$ concentration of 7% by mass by the addition of deionized water. The cake was aged at 95° C. for 3 hours in an aging tank equipped with a reflux condenser and dehydrated to provide a cake-like alumina-based composite oxide hydrate (G).

A carrier G was produced as in Production example 1, except that the alumina-based composite oxide hydrate (D) was changed to the alumina-based composite oxide hydrate (G). Table 1 presents the chemical composition of the carrier G.

Production Example 5: Preparation of Carrier H

First, 60.9 kg of deionized water was placed in a tank equipped with a circulation line with two chemical inlets. Then 20.7 kg of an aqueous solution of aluminum sulfate (concentration: 7% by mass in terms of $Al_2O_3$), which was an aqueous solution of an acidic aluminum salt, was added thereto under stirring. The resulting diluted aqueous solution was heated to 60° C. and circulated. The diluted aqueous solution had a pH of 2.3. While stirring the diluted aqueous solution, 266 g of boric acid was added to the diluted aqueous solution to prepare an aqueous acidic aluminum salt solution (H1).

Next, 15.5 kg of an aqueous solution of sodium aluminate (concentration: 22% by mass in terms of $Al_2O_3$), which was an aqueous solution of a basic aluminum salt, was added to the aqueous acidic aluminum salt solution (H1) over a period of 60 minutes while the aqueous solution being stirred, circulated, and maintained at 60° C., thereby preparing a slurry. The pH of the slurry was adjusted to 9.5. The resulting alumina-based composite oxide hydrate was washed with deionized water having a temperature of 60° C. to remove impurities, such as sodium and sulfate radicals, thereby providing a washed cake. The washed cake was adjusted to have an $Al_2O_3$ concentration of 10% by mass by the addition of deionized water. The cake was aged at 95° C. for 3 hours in an aging tank equipped with a reflux condenser and dehydrated to provide a cake-like alumina-based composite oxide hydrate (H).

A carrier H was produced as in Production example 1, except that the alumina-based composite oxide hydrate (D) was changed to the alumina-based composite oxide hydrate (H). Table 1 presents the chemical composition of the carrier H.

Production Example 6: Preparation of Carrier I

First, 60.2 kg of deionized water was placed in a tank equipped with a circulation line with two chemical inlets. Then 19.8 kg of an aqueous solution of aluminum sulfate (concentration: 7% by mass in terms of $Al_2O_3$), which was an aqueous solution of an acidic aluminum salt, was added thereto under stirring. The resulting diluted aqueous solution was heated to 60° C. and circulated. The diluted aqueous solution had a pH of 2.3. While stirring the diluted aqueous solution, 5.00 kg of an aqueous solution of titanyl sulfate (concentration: 5% by mass in terms of $TiO_2$) and 162 g of phosphoric acid (concentration: 61.6% by mass in terms of $P_2O_5$) were sequentially added to the diluted aqueous solution to prepare an aqueous acidic aluminum salt solution (I1).

Next, 14.8 kg of an aqueous solution of sodium aluminate (concentration: 22% by mass in terms of $Al_2O_3$), which was an aqueous solution of a basic aluminum salt, was added to the aqueous acidic aluminum salt solution (I1) over a period of 60 minutes while the aqueous solution being stirred, circulated, and maintained at 60° C., thereby preparing a slurry. The pH of the slurry was adjusted to 9.5. The resulting alumina-based composite oxide hydrate was washed with deionized water having a temperature of 60° C. to remove impurities, such as sodium and sulfate radicals, thereby providing a washed cake. The washed cake was adjusted to have an $Al_2O_3$ concentration of 8% by mass by the addition of deionized water. The cake was aged at 95° C. for 3 hours in an aging tank equipped with a reflux condenser and dehydrated to provide a cake-like alumina-based composite oxide hydrate (I).

A carrier I was produced as in Production example 1, except that the alumina-based composite oxide hydrate (D) was changed to the alumina-based composite oxide hydrate (I). Table 1 presents the chemical composition of the carrier I.

Production Example 7: Preparation of Carrier J

First, 63.4 kg of deionized water was placed in a tank equipped with a circulation line with two chemical inlets. Then 20.5 kg of an aqueous solution of aluminum sulfate (concentration: 7% by mass in terms of $Al_2O_3$), which was an aqueous solution of an acidic aluminum salt, was added thereto under stirring. The resulting diluted aqueous solution was heated to 60° C. and circulated. The diluted aqueous solution had a pH of 2.3. While stirring the diluted aqueous solution, 0.08 kg of phosphoric acid (concentration: 61.6% by mass in terms of $P_2O_5$) was added to the diluted aqueous solution to prepare an aqueous acidic aluminum salt solution (J1).

Next, 15.3 kg of an aqueous solution of sodium aluminate (concentration: 22% by mass in terms of $Al_2O_3$), which was an aqueous solution of a basic aluminum salt, was added to the aqueous acidic aluminum salt solution (J1) over a period of 60 minutes while the aqueous solution being stirred, circulated, and maintained at 60° C., and then 0.75 kg of a silica sol (Cataloid SN, available from JGC Catalysts and Chemicals Ltd., concentration: 20% by mass in terms of $SiO_2$) was added thereto, thereby preparing a slurry. The pH of the slurry was adjusted to 9.5. The resulting alumina-based composite oxide hydrate was washed with deionized water having a temperature of 60° C. to remove impurities, such as sodium and sulfate radicals, thereby providing a washed cake. The washed cake was adjusted to have an $Al_2O_3$ concentration of 10% by mass by the addition of deionized water. The cake was aged at 95° C. for 3 hours in an aging tank equipped with a reflux condenser and dehydrated to provide a cake-like alumina-based composite oxide hydrate (J).

A carrier J was produced as in Production example 1, except that the alumina-based composite oxide hydrate (D) was changed to the alumina-based composite oxide hydrate (J). Table 1 presents the chemical composition of the carrier J.

Comparative Production Example 1: Preparation of Carrier A

First, 31 kg of deionized water was placed in a tank equipped with a steam jacket. Then 9.1 kg of an aqueous solution of sodium aluminate (concentration: 22% by mass in terms of $Al_2O_3$), which was an aqueous solution of a basic aluminum salt, was added thereto under stirring. The resulting aqueous basic aluminum salt solution (A1) was heated to 60° C. The aqueous basic aluminum salt solution (A1) had a pH of 13.

Next, 40 kg of an aqueous solution of aluminum sulfate (concentration: 2.5% by mass in terms of $Al_2O_3$), which was an aqueous solution of an acidic aluminum salt, was added to the aqueous basic aluminum salt solution (A1) with a roller pump at a constant feed rate (addition time: 10 minutes) until the pH of the resulting aqueous solution was 7.2. The resulting alumina hydrate was washed with deionized water having a temperature of 60° C. to remove impurities, such as sodium and sulfate radicals, thereby providing a washed cake. The washed cake-like slurry was diluted with deionized water so as to have an aluminum concentration of 10% by mass in terms of $Al_2O_3$. The pH was adjusted to 10.5 with a 15% by mass aqueous ammonia solution. The resulting mixture was aged at 95° C. for 10 hours in an aging tank equipped with a reflux condenser and dehydrated to provide a cake-like alumina hydrate (A).

A carrier A was produced as in Production example 1, except that the alumina-based composite oxide hydrate (D) was changed to the alumina hydrate (A). Table 1 presents the chemical composition of the carrier A.

Comparative Production Example 2: Preparation of Carrier B

First, 62.7 kg of deionized water was placed in a tank equipped with a circulation line with two chemical inlets. Then 21.3 kg of an aqueous solution of aluminum sulfate (concentration: 7% by mass in terms of $Al_2O_3$), which was an aqueous solution of an acidic aluminum salt, was added thereto under stirring. The resulting aqueous acidic aluminum salt solution (B1) was heated to 60° C. and circulated. The aqueous acidic aluminum salt solution (B1) had a pH of 2.3.

Next, 15.9 kg of an aqueous solution of sodium aluminate (concentration: 22% by mass in terms of $Al_2O_3$), which was an aqueous solution of a basic aluminum salt, was added to the aqueous acidic aluminum salt solution (B1) over a period of 60 minutes while the aqueous solution being stirred, circulated, and maintained at 60° C., thereby preparing an alumina hydrate (B). After the addition of the aqueous solution of sodium aluminate, the pH of the slurry was adjusted to 9.5. The resulting alumina hydrate was washed with deionized water having a temperature of 60° C. to remove impurities, such as sodium and sulfate radicals, thereby providing a washed cake. The washed cake was adjusted to have an $Al_2O_3$ concentration of 10% by mass by the addition of deionized water. The cake was aged at 95° C. for 3 hours in an aging tank equipped with a reflux condenser and dehydrated to provide a cake-like alumina hydrate (B).

A carrier B was produced as in Comparative production example 1, except that the alumina hydrate (A) was changed to the alumina hydrate (B). Table 1 presents the chemical composition of the carrier B.

Comparative Production Example 3: Preparation of Carrier C

First, 31 kg of deionized water was placed in a tank equipped with a steam jacket. Then 8.2 kg of an aqueous solution of sodium aluminate (concentration: 22% by mass in terms of $Al_2O_3$), which was an aqueous solution of a basic aluminum salt, was added thereto under stirring. The resulting diluted aqueous solution was heated to 60° C. The diluted aqueous solution had a pH of 13. While stirring the diluted aqueous solution, 3.00 kg of an aqueous solution of titanyl sulfate (concentration: 5% by mass in terms of $TiO_2$) and 0.63 kg of an aqueous solution of sodium silicate (concentration: 24% by mass in terms of $SiO_2$) were sequentially added to the diluted aqueous solution. Then 36.0 kg of an aqueous solution of aluminum sulfate (concentration: 2.5% by mass in terms of $Al_2O_3$), which was an aqueous solution of an acidic aluminum salt, was added thereto with a roller pump at a constant feed rate (addition time: 10 minutes) until the pH of the resulting aqueous solution was 7.2.

The resulting alumina-based composite oxide hydrate was washed with deionized water having a temperature of 60° C. to remove impurities, such as sodium and sulfate radicals, thereby providing a washed cake. The washed cake-like slurry was diluted with deionized water so as to have an aluminum concentration of 10% by mass in terms of $Al_2O_3$. The pH was adjusted to 10.5 with a 15% by mass aqueous ammonia solution. The resulting mixture was aged at 95° C. for 10 hours in an aging tank equipped with a reflux condenser and dehydrated to provide a cake-like alumina-based composite oxide hydrate (C).

A carrier C was produced as in Comparative production example 1, except that the alumina hydrate (A) was changed to the alumina-based composite oxide hydrate (C). Table 1 presents the chemical composition of the carrier C.

<Preparation of Impregnating Solution>
Preparation of Impregnating Solution a

First, 73.2 g of molybdenum trioxide and 33.3 g of nickel carbonate were suspended in 350 mL of ion-exchange water. The suspension was heated at 90° C. for 5 hours using a suitable reflux condenser so as not to decrease the volume of the liquid. Then 29.7 g of phosphoric acid and 27.4 g of citric acid were added thereto for dissolution, thereby preparing an impregnating solution a.

Preparation of Impregnating Solution b

An impregnating solution b was prepared in the same manner as the method for preparing the impregnating solution a, except that nickel carbonate was changed to 33.3 g of cobalt carbonate.

Preparation of Impregnating Solution c

An impregnating solution c was prepared in the same manner as the method for preparing the impregnating solution a, except that nickel carbonate was changed to 19.9 g of cobalt carbonate and 11.1 g of nickel carbonate.

Preparation of Impregnating Solution d

An impregnating solution d was prepared in the same manner as the method for preparing the impregnating solution a, except that nickel carbonate was changed to 10.0 g of cobalt carbonate and 22.2 g of nickel carbonate.

Preparation of Impregnating Solution e

First, 45.5 g of molybdenum trioxide and 20.7 g of nickel carbonate were suspended in 350 mL of ion-exchange water. The suspension was heated at 90° C. for 5 hours using a suitable reflux condenser so as not to decrease the volume of the liquid. Then 18.5 g of phosphoric acid and 17.1 g of citric acid were added thereto for dissolution, thereby preparing an impregnating solution e.

Preparation of Impregnating Solution f

First, 96.9 g of molybdenum trioxide and 44.6 g of nickel carbonate were suspended in 350 mL of ion-exchange water. The suspension was heated at 90° C. for 5 hours using a suitable reflux condenser so as not to decrease the volume of the liquid. Then 39.9 g of phosphoric acid and 36.8 g of citric acid were added thereto for dissolution, thereby preparing an impregnating solution f.

Comparative Example 1: Preparation of Hydrodesulfurization Catalyst (1)

An appropriate amount of deionized water was added to the impregnating solution a in such a manner that the volume of the resulting impregnating solution a was equal to the total pore volume of 500 g of the carrier A. Then 500 g of the carrier A was spray-impregnated with the resulting impregnating solution a. The resulting carrier was dried at 250° C. and calcined in an electric furnace at 550° C. for 1 hour to produce a desulfurization catalyst (1) (hereinafter, also referred to simply as a "catalyst (1)". The same applies to the following examples.

Comparative Examples 2 to 6 and Examples 1 to 12: Preparation of Hydrodesulfurization Catalysts (2) to (18)

Catalysts (2) to (18) were prepared in the same manner as in Comparative Example 1, except that the carriers and the impregnating solutions prepared as described above were combined as described in Tables 1 to 3.

<Evaluation of Catalyst Performance>

Commercially available demetallization catalysts, transition catalysts, and desulfurization catalysts, and catalysts of Examples or Comparative Examples were loaded into a fixed-bed flow reactor (volume of catalyst loaded: 350 mL) in the following order:

35 mL of a commercially available demetallization catalyst (CDS-RS110, available from JGC Catalysts and Chemicals Ltd.), 35 mL of a commercially available demetallization catalyst (CDS-RS210, available from JGC Catalysts and Chemicals Ltd.), 70 mL of a commercially available transition catalyst (CDS-RS420, available from JGC Catalysts and Chemicals Ltd.), 105 mL of a commercially available desulfurization catalyst (CDS-R38C, available from JGC Catalysts and Chemicals Ltd.), and 105 mL of the catalyst of Example or Comparative example.

The loaded catalysts were subjected to pre-sulfurization treatment in order to activate the catalysts by desorbing the oxygen atoms contained in the catalysts. This treatment was performed in the usual manner, i.e., by passing a sulfur compound-containing liquid or gas through a controlled reaction vessel at a temperature of 200° C. to 400° C. in an atmosphere having a hydrogen pressure of normal to 100 MPa.

A heavy oil (density at 15° C.: 0.9741 g/cm³, sulfur content: 4.06% by mass, metal (Ni+V) content: 85.1 ppm by mass, nitrogen content: 2,075 ppm by mass, asphaltene content: 4.2% by mass, and residual carbon content: 10.7% by mass) was introduced into the fixed-bed flow reactor and subjected to hydrotreatment. The reaction conditions included a hydrogen partial pressure of 13.5 MPa, a liquid hourly space velocity of 0.3 h$^{-1}$, a hydrogen-oil ratio of 800 Nm³/kl. The sulfur content, the nitrogen content, and the residual carbon content in the final product oil were analyzed at different reaction temperatures in the range of 360° C. to 380° C.

In the activity test, the reaction rate constant was determined from an Arrhenius plot. The reaction rate constant obtained from the evaluation results when the catalyst (1) was loaded in the desulfurization catalyst section at a reaction temperature of 370° C. was defined as 100%. The desulfurization activity, the denitrogenation activity, and the residual carbon removal activity (relative activity) at 370° C.

were calculated when other catalysts were loaded in the desulfurization catalyst section. The reaction rate constant was determined on the basis of equation (1) below.

$$K_n = LHSV \times 1/(n-1) \times (1/P^{n-1} - 1/F^{n-1}) \quad (1)$$

where
Kn: Reaction rate constant,
n: The desulfurization reaction rate, the denitrogenation reaction rate, or the residual carbon removal reaction rate is proportional to the power of the concentration of sulfur, nitrogen, or residual carbon in the feedstock oil, respectively (n=2.0 for the desulfurization reaction, n=1.0 for the denitrogenation reaction, and n=1.0 for the residual carbon removal reaction),
P: The sulfur concentration (% by mass), the nitrogen concentration (% by mass), or the residual carbon concentration (% by mass) in the processed oil,
F: The sulfur concentration (% by mass), the nitrogen concentration (% by mass), or the residual carbon concentration (% by mass) in the feedstock oil, and
LHSV: Liquid hourly space velocity ($hr^{-1}$).

Tables 1 to 3 present the results. The catalyst (1) of Comparative example contained the carrier consisting only of alumina and exhibited a reduction peak temperature of lower than the value A. Although the catalyst (1) had the same pore characteristics as the catalyst of Example, the catalyst (1) did not have superior catalytic activity.

The catalyst (2) of Comparative example contained molybdenum and cobalt as the metal component and the carrier consisting only of alumina. The catalyst (2) was inferior in catalytic activity to the catalyst (14) of Example, which had a comparable amount of the metal component and exhibited a reduction peak temperature of higher than the value A.

The catalyst (3) of Comparative example contained the carrier component consisting only of alumina and exhibited a reduction peak temperature of lower than the value A. The catalyst (3) had different pore characteristics from the catalyst of Example and did not have superior catalytic activity.

The catalyst (4) of Comparison example contained the carrier composed of alumina-titania-silica composite oxide and had the same pore characteristics as in Example. However, the catalyst (4) exhibited a reduction peak temperature of lower than the value A and did not have superior catalytic activity.

Although both catalysts (9) and (13) had almost the same chemical composition, the presence of the silica component was considered to be different because the catalyst (9) was prepared using sodium silicate and the catalyst (13) was prepared using the silica sol. However, both catalysts (9) and (13) exhibited reduction peak temperatures of higher than the value A. Other physical properties thereof were within the scope disclosed in the present invention. These catalysts exhibited superior catalytic activity.

All other catalysts of Examples exhibited high desulfurization, denitrogenation, and residual carbon removal activities.

In Tables 2 and 3, the catalytic activities at different amounts of active metals are compared.

The catalyst (5) of Comparative example had a small amount of metal component, contained the carrier component consisting only of alumina, and exhibited a reduction peak temperature of lower than the value A. In contrast, the catalyst (17) of Example, which had the same amount of metal component as the catalyst (5), contained the composite oxide carrier, and exhibited a reduction peak temperature of higher than the value A, was superior in catalytic performance to the catalyst (5).

Comparison of the catalysts (6) and (18) indicates that even in the case of a large amount of metal component, the catalyst exhibits superior catalytic activity when the reduction peak temperature is higher than the value A.

TABLE 1-1

|  |  |  | Comparative example ||||
|---|---|---|---|---|---|---|
|  |  |  | 1 | 2 | 3 | 4 |
|  | Catalyst |  | Catalyst (1) | Catalyst (2) | Catalyst (3) | Catalyst (4) |
|  | Carrier |  | A | A | B | C |
|  | Impregnating solution |  | a | b | a | a |
| Carrier composition | $Al_2O_3$ content (balance) | % by mass | 100 | 100 | 100 | 89.8 |
|  | $TiO_2$ content | % by mass |  |  |  | 5.1 |
|  | $ZrO_2$ content | % by mass |  |  |  |  |
|  | $SiO_2$ content | % by mass |  |  |  | 5.1 |
|  | $P_2O_5$ content | % by mass |  |  |  |  |
|  | MgO content | % by mass |  |  |  |  |
|  | $B_2O_3$ content | % by mass |  |  |  |  |
| Carrier characteristics | Average pore diameter of carrier | nm | 12.8 | 12.8 | 13.9 | 10.7 |
|  | Sum of pore volumes of pores with pore diameter in range of ±2 nm of average pore diameter | % | 58 | 58 | 47 | 61 |
|  | Sum of pore volumes of pores with pore diameter in range of 20 nm or more | % | 5 | 6 | 12 | 4 |
|  | Pore volume of carrier | ml/g | 0.86 | 0.86 | 0.88 | 0.83 |

TABLE 1-1-continued

|  |  |  | Comparative example | | | |
|---|---|---|---|---|---|---|
|  |  |  | 1 | 2 | 3 | 4 |
| Catalyst composition | MoO₃ content | % by mass | 12 | 12 | 12 | 12 |
|  | CoO content | % by mass |  | 3.0 |  |  |
|  | NiO content | % by mass | 3.0 |  | 3.0 | 3.0 |
| Catalyst characteristics | Specific surface area of catalyst | m²/g | 218 | 209 | 201 | 263 |
|  | Amount of NO adsorbed on catalyst | ml/g | 5.8 | 6.3 | 5.7 | 5.2 |
|  | Value A | ° C. | 351 | 376 | 351 | 351 |
|  | Peak temperature in temperature-programmed reduction | ° C. | 347 | 373 | 346 | 348 |
| Catalytic activity | Relative desulfurization activity | % | 100 | 108 | 98 | 94 |
|  | Relative denitrogenation activity | % | 100 | 92 | 91 | 106 |
|  | Relative residual carbon removal activity | % | 100 | 91 | 93 | 92 |

TABLE 1-2

|  |  |  | Example | | | | | | | | | |
|---|---|---|---|---|---|---|---|---|---|---|---|---|
|  |  |  | 1 | 2 | 3 | 4 | 5 | 6 | 7 | 8 | 9 | 10 |
|  | Catalyst |  | Catalyst (7) | Catalyst (8) | Catalyst (9) | Catalyst (10) | Catalyst (11) | Catalyst (12) | Catalyst (13) | Catalyst (14) | Catalyst (15) | Catalyst (16) |
|  | Carrier |  | D | E | F | G | H | I | J | D | D | D |
|  | Impregnating solution |  | a | a | a | a | a | a | a | b | c | d |
| Carrier composition | Al₂O₃ content (balance) | % by mass | 90.1 | 90 | 95.9 | 95.2 | 96.9 | 93.1 | 95.9 | 90.1 | 90.1 | 90.1 |
|  | TiO₂ content | % by mass | 4.8 |  |  |  |  | 4.9 | 4.8 | 4.8 | 4.8 | 4.8 |
|  | ZrO₂ content | % by mass |  | 6.1 |  |  |  |  |  |  |  |  |
|  | SiO₂ content | % by mass | 5.1 | 3.9 | 3.2 |  |  |  | 3.1 | 5.1 | 5.1 | 5.1 |
|  | P₂O₅ content | % by mass |  |  | 0.9 |  |  | 2.0 | 1.0 |  |  |  |
|  | MgO content | % by mass |  |  |  | 4.8 |  |  |  |  |  |  |
|  | B₂O₃ content | % by mass |  |  |  |  | 3.1 |  |  |  |  |  |
| Carrier characteristics | Average pore diameter of carrier | nm | 11.2 | 10.6 | 13.1 | 9.8 | 9.4 | 12.1 | 12.8 | 11.2 | 11.2 | 11.2 |
|  | Sum of pore volumes of pores with pore diameter in range of ±2 nm of average pore diameter | % | 68 | 64 | 67 | 63 | 59 | 56 | 62 | 68 | 68 | 68 |
|  | Sum of pore volumes of pores with pore diameter in range of 20 nm or more | % | 5 | 6 | 6 | 4 | 3 | 8 | 7 | 5 | 5 | 5 |
|  | Pore volume of carrier | ml/g | 0.78 | 0.72 | 0.83 | 0.71 | 0.71 | 0.82 | 0.85 | 0.78 | 0.78 | 0.78 |
| Catalyst composition | MoO₃ content | % by mass | 12 | 12 | 12 | 12 | 12 | 12 | 12 | 12 | 12 | 12 |
|  | CoO content | % by mass |  |  |  |  |  |  |  | 3.0 | 2.0 | 1.0 |
|  | NiO content | % by mass | 3.0 | 3.0 | 3.0 | 3.0 | 3.0 | 3.0 | 3.0 |  | 1.1 | 2.1 |
| Catalyst characteristics | Specific surface area of catalyst | m²/g | 287 | 254 | 291 | 265 | 301 | 241 | 274 | 291 | 274 | 265 |
|  | Amount of NO adsorbed on catalyst | ml/g | 5.5 | 5.8 | 5.2 | 5.2 | 5.4 | 6.5 | 5.3 | 6.5 | 6.5 | 5.7 |
|  | Value A | ° C. | 351 | 351 | 351 | 351 | 351 | 351 | 351 | 376 | 367 | 359 |
|  | Peak temperature in temperature-programmed reduction | ° C. | 360 | 356 | 358 | 356 | 355 | 356 | 356 | 380 | 370 | 363 |

TABLE 1-2-continued

|  |  |  | Example |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
| Catalytic activity | Relative desulfurization activity | % | 114 | 109 | 113 | 112 | 110 | 118 | 112 | 116 | 116 | 111 |
|  | Relative denitrogenation activity | % | 131 | 127 | 130 | 126 | 127 | 114 | 124 | 117 | 114 | 127 |
|  | Relative residual carbon removal activity | % | 112 | 108 | 110 | 104 | 107 | 104 | 112 | 103 | 102 | 107 |

TABLE 2

|  |  |  | Comparative example 5 | Example 11 |
|---|---|---|---|---|
|  | Catalyst |  | Catalyst (5) | Catalyst (17) |
|  | Carrier |  | A | D |
|  | Impregnating solution |  | e | e |
| Carrier composition | Al$_2$O$_3$ content (balance) | % by mass | 100 | 90.1 |
|  | TiO$_2$ content | % by mass |  | 4.8 |
|  | ZrO$_2$ content | % by mass |  |  |
|  | SiO$_2$ content | % by mass |  | 5.1 |
|  | P$_2$O$_5$ content | % by mass |  |  |
|  | MgO content | % by mass |  |  |
|  | B$_2$O$_3$ content | % by mass |  |  |
| Carrier characteristics | Average pore diameter of carrier | nm | 12.8 | 11.2 |
|  | Sum of pore volumes of pores with pore diameter in range of ±2 nm of average pore diameter | % | 58 | 68 |
|  | Sum of pore volumes of pores with pore diameter in range of 20 nm or more | % | 5 | 5 |
|  | Pore volume of carrier | ml/g | 0.86 | 0.78 |
| Catalyst composition | MoO$_3$ content | % by mass | 8 | 8 |
|  | CoO content | % by mass |  |  |
|  | NiO content | % by mass | 2.0 | 2.0 |
| Catalyst characteristics | Specific surface area of catalyst | m$^2$/g | 229 | 295 |
|  | Amount of NO adsorbed on catalyst | ml/g | 5.1 | 5.1 |
|  | Value A | °C. | 347 | 347 |
|  | Peak temperature in temperature-programmed reduction | °C. | 341 | 355 |
| Catalytic activity | Relative desulfurization activity | % | 81 | 88 |
|  | Relative denitrogenation activity | % | 89 | 94 |
|  | Relative residual carbon removal activity | % | 84 | 91 |

TABLE 3

|  |  |  | Comparative example 6 | Example 12 |
|---|---|---|---|---|
| Carrier composition | Catalyst |  | Catalyst (6) | Catalyst (18) |
|  | Carrier |  | A | D |
|  | Impregnating solution |  | f | f |
| Carrier characteristics | Al$_2$O$_3$ content (balance) | % by mass | 100 | 90.1 |
|  | TiO$_2$ content | % by mass |  | 4.8 |
|  | ZrO$_2$ content | % by mass |  |  |
|  | SiO$_2$ content | % by mass |  | 5.1 |
|  | P$_2$O$_5$ content | % by mass |  |  |
|  | MgO content | % by mass |  |  |
|  | B$_2$O$_3$ content | % by mass |  |  |
|  | Average pore diameter of carrier | nm | 12.8 | 11.2 |
|  | Sum of pore volumes of pores with pore diameter in range of ±2 nm of average pore diameter | % | 58 | 68 |
|  | Sum of pore volumes of pores with pore diameter in range of 20 nm or more | % | 8 | 5 |
|  | Pore volume of carrier | ml/g | 0.86 | 0.78 |
| Catalyst composition | MoO$_3$ content | % by mass | 15 | 15 |
|  | CoO content | % by mass |  |  |
|  | NiO content | % by mass | 3.8 | 3.8 |

TABLE 3-continued

|  |  |  | Comparative example 6 | Example 12 |
|---|---|---|---|---|
| Catalyst characteristics | Specific surface area of catalyst | m²/g | 199 | 261 |
|  | Amount of NO adsorbed on catalyst | ml/g | 6.4 | 6.3 |
|  | Value A | ° C. | 354 | 354 |
|  | Peak temperature in temperature-programmed reduction | ° C. | 349 | 364 |
| Catalytic activity | Relative desulfurization activity | % | 107 | 116 |
|  | Relative denitrogenation activity | % | 105 | 109 |
|  | Relative residual carbon removal activity | % | 104 | 112 |

What is claimed is:

1. A hydrotreating catalyst for a heavy hydrocarbon oil, comprising:
   an inorganic oxide carrier comprising alumina as a main component and an additive oxide component; and
   a metal component supported on the inorganic oxide carrier,
   the metal component containing molybdenum and containing nickel and/or cobalt,
   the catalyst having:
   a molybdenum content of 5% to 16% by mass on an oxide basis, and a total nickel and cobalt content of 1% to 6% by mass on an oxide basis,
   a specific surface area measured by a nitrogen adsorption method of 150 to 320 m²/g,
   a value of a reduction peak temperature (° C.) that is lower than 450° C. in temperature-programmed reduction measurement of the catalyst and that is higher than or equal to a value A (° C.) given by an equation below:
   the value A (° C.)=1.0×(the molybdenum content (% by mass) of the catalyst in terms of MoO₃)+25×(the ratio of the cobalt content (% by mass) of the catalyst in terms of CoO to the sum (% by mass) of the nickel content of the catalyst in terms of NiO and the cobalt content of the catalyst in terms of CoO)+339, and
   after sulfurization treatment of the catalyst, an amount of nitrogen monoxide adsorbed of 4.0 mL/g or more when a mole ratio (Ni/(Ni+Co)) of the amount of nickel to the total amount of nickel and cobalt in the catalyst is 0.5 or more, and the amount of nitrogen monoxide adsorbed of 5.0 mL/g or more when the mole ratio is less than 0.5,
   wherein the inorganic oxide carrier contains 1% to 30% by mass of the additive oxide component, and
   the additive oxide component contains at least an oxide of any one of additive element(s) (a) to (c) below:
   (a) magnesium or boron,
   (b) a combination of silicon and at least one element(s) M selected from the group consisting of titanium, zirconium, boron, magnesium, and phosphorus, the ratio of silicon to the element(s) M being 0.4 to 3.5 in terms of (mass of silica)/(mass of the oxide of the element(s) M), and
   (c) a combination of titanium and phosphorus or a combination of zirconium and phosphorus.

2. The hydrotreating catalyst for a heavy hydrocarbon oil according to claim 1, wherein the inorganic oxide carrier satisfies that:
   the average pore diameter (PD) measured by a mercury intrusion method is 9.0 to 15.0 nm,
   the sum of pore volumes of pores having a pore diameter in a range of ±2 nm of the average pore diameter is 50% or more of the total pore volume,
   the sum of pore volumes of pores having a pore diameter in a range of 20 nm or more is 10% or less of the total pore volume, and
   the pore volume (PV) measured by a pore-filling method with water is 0.5 to 1.1 mL/g.

3. A method for producing the hydrotreating catalyst for a heavy hydrocarbon oil according to claim 1, the method comprising the steps of:
   (1) preparing a slurry containing a precursor of the inorganic oxide carrier and having a pH of 7 to 10 and then shaping the precursor;
   (2) calcining the shaped precursor at 400° C. to 800° C. to provide the inorganic oxide carrier;
   (3) preparing an impregnating solution comprising a raw material for the metal component, an acid, and water, and impregnating the inorganic oxide carrier with the impregnating solution to support the raw material for the metal component on the inorganic oxide carrier; and
   (4) calcining the inorganic oxide carrier supporting the raw material for the metal component at 400° C. to 800° C. to provide the hydrotreating catalyst,
   wherein the step (1) includes:
   an operation (1-1) of adding an aqueous solution (b) containing a basic aluminum salt to an aqueous solution (a) containing an acidic aluminum salt and having a pH of 2 to 5 to prepare a slurry of the precursor containing alumina hydrate; and
   an operation (1-2) of mixing the alumina hydrate and/or a raw material for the alumina hydrate with a raw material for the additive oxide component.

4. The method for producing the hydrotreating catalyst for a heavy hydrocarbon oil according to claim 3, wherein in the operation (1-2),
   (i) an aqueous solution of the acidic aluminum salt is mixed with the raw material for the additive oxide component to prepare the aqueous solution (a),
   (ii) an aqueous solution of the basic aluminum salt is mixed with the raw material for the additive oxide component to prepare the aqueous solution (b),
   (iii) the aqueous solution (a), the aqueous solution (b), and the raw material for the additive oxide component are mixed together to prepare the slurry containing the precursor, or
   (iv) the slurry containing the alumina hydrate is mixed with the raw material for the additive oxide component to prepare the slurry containing the precursor.

5. A method for hydrotreating a heavy hydrocarbon oil, comprising a step of:
   hydrotreating the heavy hydrocarbon oil in the presence of the hydrotreating catalyst according to claim 1.

6. The method for hydrotreating a heavy hydrocarbon oil according to claim 5, wherein the heavy hydrocarbon oil has a density of 0.90 to 1.05 g/cm³ and a sulfur content of 1% to 6% by mass and contains 80% or more by mass of a component having a boiling point of 360° C. or higher.

7. The method for hydrotreating a heavy hydrocarbon oil according to claim 5, wherein the step of hydrotreating the heavy hydrocarbon oil is performed at a hydrogen partial pressure of 5.0 to 20 MPa, a reaction temperature of 350° C. to 420° C., and a liquid hourly space velocity of 0.1 to 0.5 $hr^{-1}$.

8. The method for hydrotreating a heavy hydrocarbon oil according to claim 5, wherein the method is performed as pretreatment of fluidized-bed catalytic cracking of the heavy hydrocarbon oil.

* * * * *